US012556211B2

(12) United States Patent
Wang et al.

(10) Patent No.: US 12,556,211 B2
(45) Date of Patent: Feb. 17, 2026

(54) SYSTEMS AND METHODS FOR DIRECT CURRENT LEAKAGE LOCATION SIGNALING (71) Applicant: Apple Inc., Cupertino, CA (US)

(72) Inventors: Fucheng Wang, Cupertino, CA (US); Giuseppe Patane, Munich (DE); Sayak Bose, Nashua, NH (US); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 18/134,454

(22) Filed: Apr. 13, 2023

(65) Prior Publication Data

US 2024/0283477 A1 Aug. 22, 2024

Related U.S. Application Data (60) Provisional application No. 63/446,265, filed on Feb. 16, 2023.

(51) Int. Cl.
*H04B 1/12* (2006.01)
*H04L 5/00* (2006.01)
(52) U.S. Cl.
CPC ............. *H04B 1/123* (2013.01); *H04L 5/001* (2013.01); *H04L 5/0098* (2013.01)

(58) Field of Classification Search
CPC ........ H04B 1/123; H04L 5/001; H04L 5/0098
See application file for complete search history.

(56) References Cited

U.S. PATENT DOCUMENTS 12,040,772 B2 * 7/2024 Lenhart ................ H04B 17/104

OTHER PUBLICATIONS

R4-2119965, "LS on DC location for >2CC," 3GPP TSG-RAN WG4 Meeting #101-e, Electronic Meeting, Nov. 2021.

* cited by examiner

*Primary Examiner* — Diane D Mizrahi
(74) *Attorney, Agent, or Firm* — FLETCHER YODER PC (57) ABSTRACT

User equipment (UE) may indicate a flexible direct current (DC) leakage location signaling capability to a network that facilitates transmission of accurate DC leakage locations to the network for improved reduction of negative impact of DC leakage on signal quality of uplink (UL) allocated resources. The UE may operate in the first DC leakage location signaling mode when only a single component carrier is activated, and indicate to the network one or more DC leakage locations corresponding to the single component carrier. Additionally, the UE may operate in the second DC leakage location signaling mode when at least a portion of two or more component carriers are activated, and enable the network to determine a default DC leakage location associated the two or more component carriers.

20 Claims, 6 Drawing Sheets

SYSTEMS AND METHODS FOR DIRECT CURRENT LEAKAGE LOCATION SIGNALING

CROSS-REFERENCE TO RELATED APPLICATIONS

This application claims priority to U.S. Provisional Application No. 63/446,265, filed Feb. 16, 2023, entitled "SYSTEMS AND METHODS FOR DIRECT CURRENT LEAKAGE LOCATION SIGNALING," the disclosure of which is incorporated by reference herein in its entirety for all purposes.

BACKGROUND

The present disclosure relates generally to wireless communication, and more specifically to coexistence between multiple networks on user equipment (UE) (e.g., mobile wireless communication devices).

User equipment (UE) may include transmitters and receivers coupled to antennas to enable the UE to transmit wireless signals to and to receive wireless signals from different wireless communication network(s). However, direct current (DC) leakage (e.g., uplink (UL) carrier leakage) may be produced by components of user equipment (UE), such as during transmission of signals, and potentially affect signal quality (e.g., measured in error vector magnitude (EVM)) by causing distortion of signals associated with the allocated uplink resources for the UE communicating via a wireless communication network and/or of signals associated with additional uplink resources allocated to other UEs utilizing the same wireless communication network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment may include a transmitter and one or more processors coupled to the transmitter. The one or more processors may transmit, using the transmitter, a first indication of an uplink carrier leakage signaling capability. Further, the one or more processors may operate in a first uplink carrier leakage signaling mode when only the at least a portion of a first configured component carrier of one or more configured component carriers is activated. The one or more processors may additionally operate in a second uplink carrier leakage signaling mode when at least a portion of the first configured component carrier and at least a portion of a second configured component carrier of the one or more configured component carriers are activated.

In another embodiment, a tangible, non-transitory computer-readable medium, comprising computer-readable instructions that, when executed by processing circuitry of a base station, may cause the processing circuitry to receive, via a receiver of the base station, a first indication of an uplink carrier leakage signaling capability from a user equipment. Further the processing circuitry may transmit, via a transmitter of the base station, a second indication of a frequency band configuration to the user equipment, the frequency band configuration comprising one or more configurable frequency band ranges and one or more activation states associated with the one or more configurable frequency band ranges for transmitting wireless signals, receiving wireless signals, or both. The processing circuitry may receive, via the receiver, a third indication of one or more uplink carrier leakage locations associated with a first configurable frequency band range of the one or more configurable frequency band ranges from the user equipment when only at least the portion of the first configurable frequency band range is activated, and filter, via the processing circuitry, uplink carrier leakage from the wireless signals based on the one or more uplink carrier leakage locations. In addition, the processing circuitry may receive, via the receiver, a fourth indication of a user equipment selected component configuration operation from the user equipment when the at least a portion of a first configurable frequency band range and at least a portion of a second configurable frequency band range of the one or more configurable frequency band ranges is activated, and filter, via the processing circuitry, the uplink carrier leakage from the wireless signals based on the user equipment selected component configuration operation.

In another embodiment, a method may include transmitting, via a transmitter of user equipment, a first indication of a direct current leakage signaling capability to a wireless communication network communicatively coupled to the user equipment. Further, the method may include receiving, via a receiver of the user equipment, a second indication that only at least one bandwidth part of a primary component carrier is activated. The method may additionally include operating in a first direct current leakage signaling mode based on only the at least one bandwidth part of the primary component carrier being activated. Furthermore, the method may include receiving, via the receiver, a third indication that at least one bandwidth part of the primary component carrier and at least one bandwidth part of a secondary component carrier of one or more secondary component carriers is activated, and operating in a second direct current leakage signaling mode based on the at least one bandwidth part of the primary component carrier and the at least one bandwidth part of the secondary component carrier being activated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

When communicating using a wireless communication network, user equipment (UE) may transmit wireless signals using a heterodyne radio frequency (RF) architecture (e.g., via a heterodyne transceiver, via a heterodyne transmitter) and may up-convert the transmission signals from a lower frequency to a higher frequency carrier (e.g., within a higher frequency range) for efficient transmission of the wireless signals to the wireless communication network (e.g., and/or via the wireless communication network) at the higher frequency. However, during communication operations via the wireless communication network, the heterodyne transceiver (e.g., heterodyne transmitter) of the UE may produce direct current (DC) signal leakage (e.g., uplink (UL) carrier leakage, DC leakage) at a transmitter output port. For instance, in some embodiments, the DC leakage may include an undesired single-tone signal (e.g., signal leakage) produced by a local oscillator (LO) within the heterodyne transmitter and leaked from a mixer local oscillator LO port to the transmitter output port. Additionally or alternatively, the DC leakage may include residual DC offset produced during baseband signal up-conversion via the LO. In either case, the DC leakage may be emitted via the transmitter output port of the UE and may negatively affect signal quality associated with the UL allocated resources, for example, by causing signal distortion. In particular, in some embodiments, when a frequency of the DC leakage is within a frequency (e.g., and/or frequency range) of allocated UL resources (e.g., allocated UL carriers) of the UE, the DC leakage may affect signal quality (e.g., cause signal distortion) associated with the allocated UL resources of the UE. Additionally or alternatively, in some embodiments, the frequency of the DC leakage may be outside of a frequency (e.g., frequency range) of the allocated UL resources of the UE. However, the frequency of the DC leakage may be within or cause intermodulation products with additional UL resources allocated to other UEs and affect the UL signal quality associated with other orthogonal frequency-division multiple access (OFDMA) users (e.g., in-band emission (IBE)) in the same wireless communication network (e.g., other UEs communicating via the same wireless communication network).

To reduce or substantially eliminate the aforementioned negative effects of the DC leakage on the signal quality of the UL allocated resources (e.g., UL allocated carriers for the UE and/or for other UEs on the same wireless communication network), the wireless communication network may process the UL signal carriers before signal demodulation to reduce or substantially remove the DC leakage and/or reduce the signal quality impact of the DC leakage on the UL allocated resources. In particular, in some embodiments, the UE may determine and indicate to the wireless communication network a location (e.g., a frequency location) of the DC leakage to enable the wireless communication network to then utilize tone removal processes at the indicated DC leakage location to filter out the DC leakage, and thus reduce the DC leakage impact on the signal quality of the UL allocated resources (e.g., for the UE and/or for the other UEs on the same wireless communication network). However, as further described below, current designs (e.g., operations) for DC leakage location signaling for intra-band UL carrier aggregation (CA) available to the UE may be limiting (e.g., inflexible, fixed) and/or produce inaccurate DC leakage location results, and thus may not be useful or sufficiently effective in significantly reducing the impact of the DC leakage on the signal quality of the UL allocated resources.

Therefore, this disclosure is directed to a DC leakage location signaling capability (e.g., uplink (UL) carrier leakage signaling capability) for a UE that enables a flexible operation for DC leakage location signaling that facilitates transmission by the UE of indications of more accurate DC leakage locations to a wireless communication network for improved reduction of the negative impact of the DC leakage on signal quality of the UL allocated resources (e.g., to the UE and/or to other UEs within the same wireless communication network). In particular, the UE may operate in a first DC leakage location signaling mode or a second DC leakage location signaling mode based on an activation state (e.g., activated, deactivated) of at least a portion of one or more component carriers (e.g., configured component carriers, frequency band configuration, frequency bandwidths). The UE may operate in the first DC leakage location signaling mode when only a single component carrier (e.g., configured component carrier, frequency bandwidth, primary component carrier) is activated, and thus identify and transmit to the wireless communication network one or more DC leakage locations corresponding to the single component carrier. Alternatively, the UE may operate in the second DC leakage location signaling mode when at least a portion of two or more component carriers are activated, and enable the wireless communication network to compute (e.g., determine, calculate) a default DC leakage location associated with a determined UE bandwidth. In some embodiments, the determined UE bandwidth may correspond to a frequency range that includes the at least a portion of two or more component carriers. In this way, the present embodiments enable a flexible operation for DC leakage location signaling for the UE, and thus enable efficient and effective reduction in signal distortion and/or in-band emission within the UL allocated resources that may be caused by the DC leakage.

Figure 1:
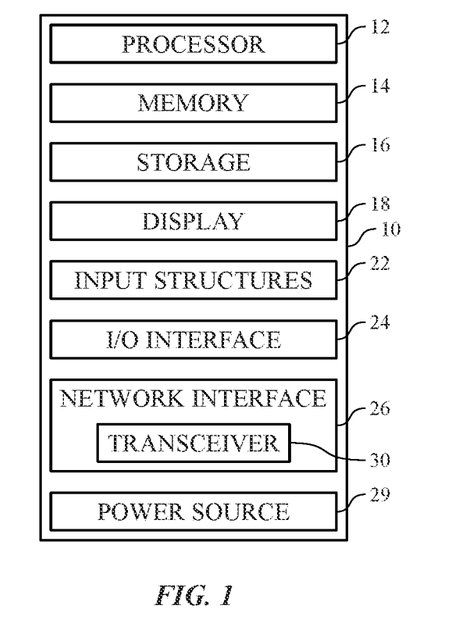
FIG. 1 is a block diagram of user equipment, according to embodiments of the present disclosure.

With the foregoing in mind, FIG. 1 is a block diagram of user equipment (UE) 10 (e.g., an electronic device, a wireless communication device, a mobile communication device, and so on), according to embodiments of the present disclosure. The UE 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the UE 10.

By way of example, the UE 10 may include any suitable computing device, including a desktop or notebook computer, a portable electronic or handheld electronic device such as a wireless electronic device or smartphone, a tablet, a wearable electronic device, and other similar devices. In additional or alternative embodiments, the UE 10 may include an access point, such as a base station, a router (e.g., a wireless or Wi-Fi® router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the UE 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the UE 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the UE 10 to provide various functionalities.

In certain embodiments, the display 18 may facilitate users to view images generated on the UE 10. In some embodiments, the display 18 may include a touch screen, which may facilitate user interaction with a user interface of the UE 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the UE 10 may enable a user to interact with the UE 10 (e.g., pressing a button to increase or decrease a volume level). The I/O interface 24 may enable UE 10 to interface with various other electronic devices, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., Wi-Fi®), and/or a wide area network (WAN) (e.g., wireless communication network), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a 6$^{th}$ generation (6G) or greater than 6G cellular network, a satellite network, a non-terrestrial network, and so on. In particular, the network interface 26 may include, for example, one or more interfaces for using a cellular communication standard of the 5G specifications that include the mmWave frequency range (e.g., 24.25-300 gigahertz (GHz) or sub-THz) that defines and/or enables frequency ranges used for wireless communication. The network interface 26 of the UE 10 may allow communication over the aforementioned network(s) (e.g., 5G, Wi-Fi®, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30 (e.g., a heterodyne transceiver). In some embodiments, all or portions of the transceiver 30 may be disposed within the processor 12. The transceiver 30 may support transmission and receipt of various wireless signals (e.g., user data) via one or more antennas, and thus may include a transmitter and a receiver. The power source 29 of the UE 10 may include any suitable source of power, such as a rechargeable lithium polymer (Li-poly) battery and/or an alternating current (AC) power converter.

Figure 2:
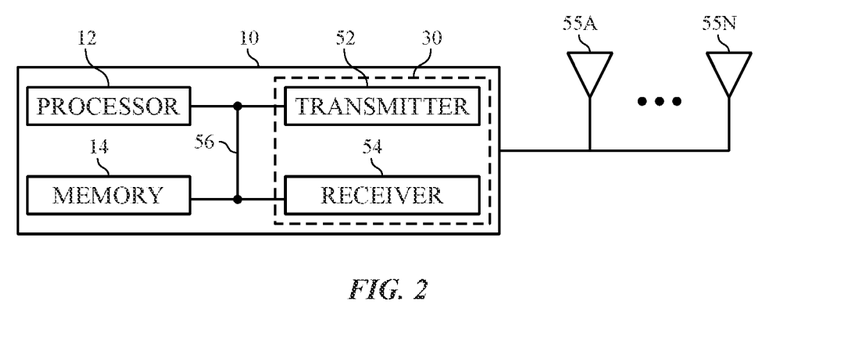
FIG. 2 is a functional diagram of the user equipment of FIG. 1, according to embodiments of the present disclosure.

FIG. 2 is a functional diagram of the UE 10 of FIG. 1, according to embodiments of the present disclosure. As illustrated, the processor 12, the memory 14, the transceiver 30 (e.g., a heterodyne transceiver 30), a transmitter 52 (e.g., a heterodyne transmitter 52), a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The UE 10 may include the transmitter 52 and/or the receiver 54 that respectively enable transmission and reception of data between the UE 10 and an external device via, for example, a network (e.g., wireless communication network, including base stations or access points) or a direct connection. As illustrated, the transmitter 52 and the receiver 54 may be combined into the transceiver 30. The UE 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The UE 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the UE 10 may be coupled together by a bus system 56. The bus system 56 may include a data bus, for example, as well as a power bus, a control signal bus, and a status signal bus, in addition to the data bus. The components of the UE 10 may be coupled together or accept or provide inputs to each other using some other mechanism.

Figure 3:
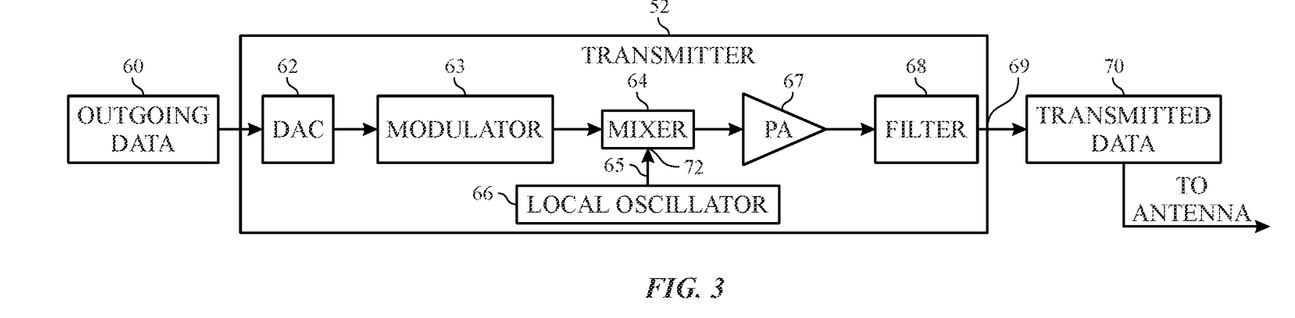
FIG. 3 is a schematic diagram of a transmitter of the user equipment of FIG. 1, according to embodiments of the present disclosure.

As mentioned above, the transceiver 30 of the UE 10 may include the transmitter 52 and the receiver 54 that are coupled to at least one antenna 55 to enable the UE 10 to transmit and receive wireless signals (e.g., user data). FIG. 3 is a block diagram of the transmitter 52 (e.g., transmit circuitry 52, heterodyne transmitter 52) that may be part of the transceiver 30, according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 63 may combine the converted analog signal with a carrier signal. A mixer 64 may combine the carrier signal with a local oscillator signal 65 (which may include quadrature component signals) from a local oscillator (LO) 66 to generate a radio frequency signal (e.g., up-converted signal). A power amplifier (PA) 67 receives the radio frequency signal from the mixer 64, and may amplify the modulated signal to a suitable level to drive transmission of the signal via the one or more antennas 55. A filter 68 (e.g., filter circuitry and/or software) of the transmitter 52 may then remove undesirable noise from the amplified signal exiting a transmitter output port 69 to generate transmitted data 70 to be transmitted via the one or more antennas 55 (e.g., coupled to the transmitter output port 69). The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include an additional mixer and/or a digital up converter (e.g., for converting an output signal from an intermediate frequency to a baseband/carrier frequency). As another example, the transmitter 52 may not include the filter 68 if the power amplifier 67 outputs the amplified signal in or approximately in a desired frequency range (such that filtering of the amplified signal may be unnecessary).

As discussed herein, during transmission of wireless signals, the transmitter 52 of the UE 10 may up-convert the wireless signals from a lower frequency to a higher frequency carrier (e.g., within a higher frequency range) for efficient transmission of the wireless signals to a wireless communication network (e.g., and/or via the wireless communication network) at the higher frequency. However, during communication operations, the transmitter 52 may produce direct current (DC) signal leakage (e.g., uplink (UL) carrier leakage, DC leakage) at the transmitter output port 69 when emitting the transmission signals. In other words, the DC leakage may be one or more disruptive signals that unintentionally leak from the transmitter output port 69 and may then be transmitted along with the transmission signals via the one or more antennas 55. In some embodiments, the DC leakage may include an undesired single-tone signal (e.g., signal leakage) produced by the LO 66 of the transmitter 52 and may be leaked from a mixer LO port 72 to the transmitter output port 69. Additionally or alternatively, the DC leakage may include residual DC offset produced during baseband signal up-conversion via the LO 66 (e.g., analog up-converter). In either case, the DC leakage may be emitted via the transmitter output port 69 of the transmitter 52, and thus may be transmitted via the one or more antennas 55.

In some embodiments, the DC leakage may negatively affect signal quality associated with uplink (UL) allocated resources (e.g., UL allocated carriers, UL allocated frequency bands) for the UE 10, for example, by causing signal distortion. In particular, in some embodiments, when a frequency of the DC leakage is within a frequency (e.g., and/or frequency range) of allocated UL resources (e.g., allocated UL carriers) of the UE 10, the DC leakage may affect signal quality (e.g., cause signal distortion) associated with the allocated UL resources of the UE 10. Additionally or alternatively, in some embodiments, the frequency of the DC leakage may be outside of a frequency (e.g., frequency range) of the allocated UL resources of the UE 10. However, the frequency of the DC leakage may be within or cause intermodulation products with additional UL carriers allocated to other UEs and affect the UL signal quality associated with other orthogonal frequency-division multiple access (OFDMA) users (e.g., in-band emission (IBE)) in the same wireless communication network (e.g., other UEs communicating via the same wireless communication network).

Figure 4:
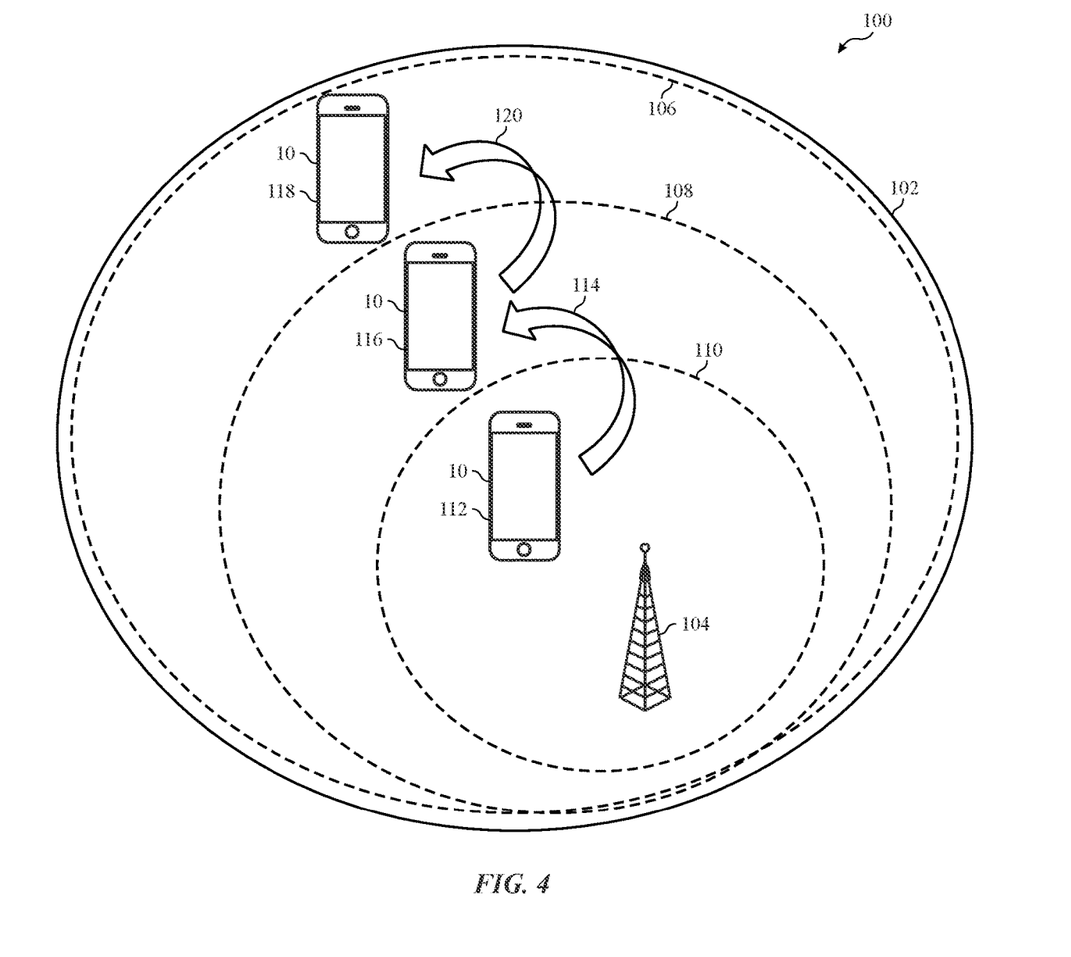
FIG. 4 is a schematic diagram of a communication system including the user equipment of FIG. 1 communicatively coupled to a wireless communication network, according to embodiments of the present disclosure.

With the foregoing in mind, FIG. 4 is a schematic diagram of a communication system 100 including the UE 10 of FIG. 1 communicatively coupled to a wireless communication network 102 (e.g., a network 102, wireless network 102) supported by base station 104, according to embodiments of the present disclosure. In particular, the base station 104 may include a Next Generation NodeB (gNodeB or gNB) base station and may provide 5G/NR coverage via the wireless communication network 102 to the UE 10. The base station 104 may include any suitable electronic device, such as a communication hub or node that facilitates, supports, and/or implements the wireless communication network 102. In some embodiments, the base stations 104 may include an Evolved NodeB (eNodeB) base station and may provide 4G/LTE coverage via the wireless communication network 102 to the UE 10. Furthermore, in some embodiments, the base station 104 may support one or more serving cells (e.g., coverage areas) corresponding to a respective one or more component carriers (e.g., frequency bands). In particular, a respective serving cell may correspond to a geographic area for which a respective component carrier (e.g., frequency band) of the serving cell may be utilized for transmitting and receiving data. For example, the base station 104 may include a primary serving cell (PSC) 106 and one or more secondary serving cells (SSC), such as the illustrated first and second SSCs 108, 110. It should be understood that the geographic coverage area of the one or more serving cells may differ due to each serving cell corresponding to different component carriers (e.g., frequency bands) that may experience varying amounts of path loss (e.g., path attenuation, loss of power over distance travelled). Furthermore, the PSC 106 may be used to establish a connection with the base station 104 and correspond to a primary component carrier (PCC) (e.g., primary channel, primary frequency band, primary cell) to transmit and/or receive data associated with the Radio Resource Control (RRC) protocol and/or user data associated with the UE 10. The one or more SSCs (e.g., the first and second SSCs 108, 110) may each correspond to a respective second component carrier (SCC) (e.g., secondary channel, secondary frequency band, secondary cell) that may be used to transmit and/or receive additional user data associated with the UE 10.

It should be understood that in some embodiments, the base station 104 may include at least some of the components of the UE 10 shown in FIGS. 1 and 2, including one or more processors 12, the memory 14, the storage 16, the transceiver 30, the transmitter 52, the receiver 54, and the associated circuitry shown in FIG. 3. It should also be understood that while the present disclosure may use 5G/NR as an example specification or standard, the embodiments disclosed herein may apply to other suitable specifications or standards (e.g., such as the 4G/LTE specification, a sub-4G specification, a sixth generation (6G) specification, a beyond 6G specification, and so on). Moreover, the network 102 may include any suitable number of UE(s) 10 (e.g., one or more UE 10, four or more UE 10, ten or more UE 10, and so on) and/or base stations 104 (e.g., one or more base stations 104, four or more base stations 104, ten or more base stations 104, and so on).

To connect to the base station 104, the UE 10 may be located within the PSC 106 and may scan to detect the base station 104 of the wireless communication network 102. In particular, the UE 10 may detect the base station 104 by receiving a radio frequency (RF) signal when the UE 10 enters the PSC 106 of the base station 104 (e.g., a geographical region for which the base station 104 provides network coverage). The UE 10 may synchronize to the base station 104 by aligning its RF signal with the RF signal of the base station 104A. Further, the base station 104 may broadcast or transmit system information (e.g., downlink data including the RRC protocol via the PCC) with may include one or more indications of available frequency bands (e.g., UL allocated resources, UL allocated carrier, component carriers (CC)) supported by the base station 104 (e.g., via the one or more associated serving cells, such as the PSC 106 and/or the one or more secondary serving cells (SSC) 108, 110). The system information may also include timing specification, power specifications, Global Positioning System (GPS) or Global Navigation Satellite System (GNSS) coordinates, and/or other suitable information to enable the UE 10 to establish the connection with the base station 104. The UE 10 may receive the system information and establish a communication link (e.g., via configuration of the available CCs) with the base station 104 and the wireless communication network 102. For example, user data (e.g., via wireless signals) may be sent over one or more of the configured CCs (e.g., channels, frequency bands) associated with the one or more serving cells (e.g., PSC 106, SSCs 108, 110) that is allocated to the UE 10 by the base station 104 and/or the wireless communication network 102. Moreover, the UE 10 may monitor the communication link for signal characteristics, such as a signal strength, a signal quality, or the like. In other words, the base station 104 may transmit or receive user data to or from the UE 10 over the one or more configured CCs allocated to the UE 10 (e.g., via the established communication link). Furthermore, the UE 10 may transmit indication of its capabilities (e.g., uplink data) to the base station 104 that, as discussed herein, may include information indicative of one or more locations of the DC leakage.

Continuing with the discussion of FIG. 4, in some embodiments, the UE 10 may establish the communication link with the base station 104, and may also move between coverage areas associated with the one or more SSCs (e.g., the first SSC 108, the second SSC 110) of the base station 104. In this way, depending on the location of the UE 10, the UE 10 may dynamically adjust using respective allocated component carriers (CC) associated with the one or more serving cells for transmitting and/or receiving wireless signals (e.g., communication with the wireless communication network 102, transmitting and/or receiving information/data). For example, as illustrated in FIG. 4, the UE 10 may be in a first location 112 that is within the respective geographic areas covered by each of the PSC 106, the first SSC 108, and the second SSC 110. As such, in the first location 112, the UE 10 may utilize the PCC associated with the PSC 106 and a first SCC associated with the first SSC 108, a second SCC associated with the second SSC 110, or both. However, in certain instances, the UE 10 may move locations (e.g., indicated by arrow 114, relative to the PSC 106, the first SSC 108, and/or the second SSC 110) or an object may interfere with one or more connections associated with the PSC 106, the first SSC 108, and/or the second SSC 110. For example, movement of the UE 10 to a second location 116 may cause the UE 10 to leave the respective geographic area covered by the first SSC 108 of the base station 104, thereby degrading the communication link utilizing the first SCC associated with the first SSC 108. Additionally, the UE 10 may remain in the respective geographic areas associated with the second SSC 110 and the PSC 106, and thus retain the communication link with the wireless communication network 102 utilizing the PCC associated with the PSC 106, or the PCC in combination with the second SCC associated with the second SSC 110. Furthermore, the UE 10 may be in and/or move to (e.g., indicated by arrow 120) a second location 118 that is outside of the respective geographic areas associated with the first and second SSCs 108, 110, but within the respective geographic area associated with the PSC 106. In this instance, the UE 10 may utilize only the PCC associated with the PSC 106 to transmit and/or receive wireless signals for communication with the wireless communication network 102. Thus, as described above, the UE 10 may dynamically adjust between communication operations using only the PCC associated with base station 104 and/or utilizing the PCC in combination with one or more of the SCC respectively associated with one or more of the SSCs (e.g., the first and/or second SSCs 108, 110) of the base station 104 (e.g., the wireless communication network 102).

It should be understood that, in some embodiments, respective geographic areas associated with the one or more serving cells of a base station may include various sizes (e.g., smaller, bigger), shapes, and arrangements (e.g., areas that overlap, areas that don't overlap) with respect to each other, that may be different than the sizes, shapes, and arrangements illustrated in FIG. 4. In addition, it should be understood, that although only two SSCs (e.g., the first and the second SSCs 108, 110) are illustrated in FIG. 4, in some embodiments, there may be greater or lesser number (e.g., 1, 3, 4, 5, 6, 10) of SSCs associated with a respective base station.

Figure 5:
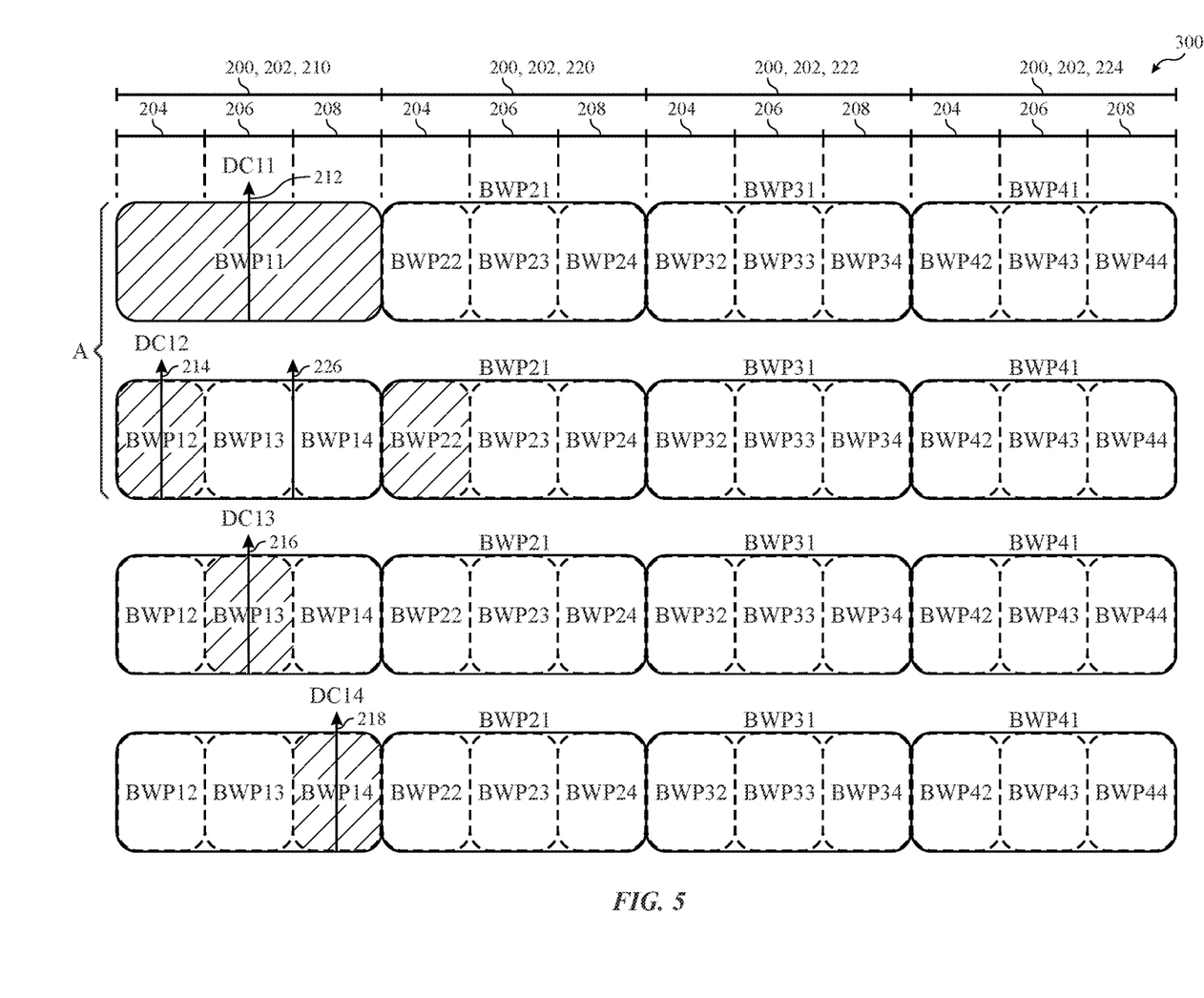
FIG. 5 is a schematic diagram of a first direct current (DC) leakage location signaling mode that may identify one or more DC leakage locations corresponding to one or more bandwidth parts for the user equipment of FIG. 1, according to embodiments of the present disclosure.
Figure 6:
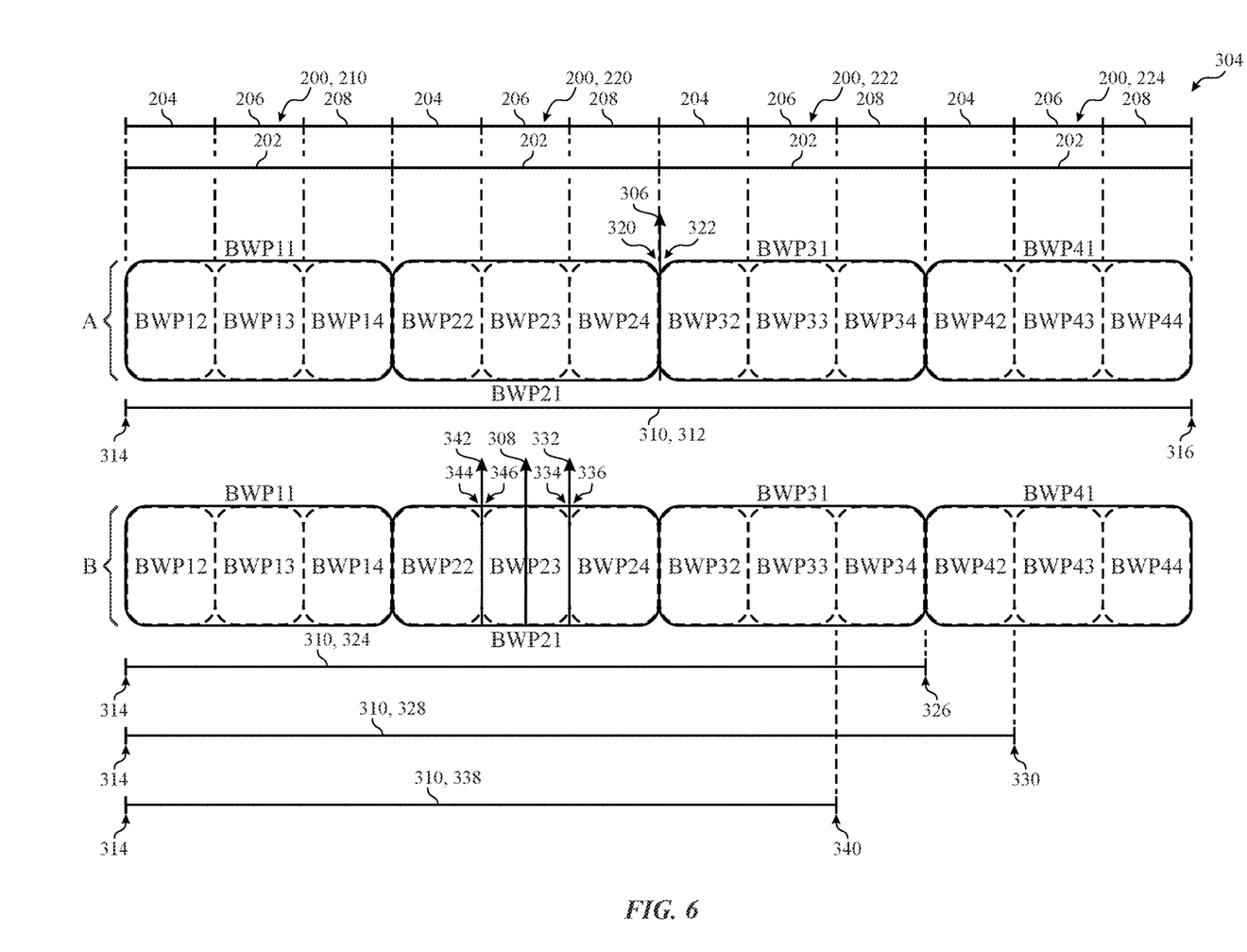
FIG. 6 is a schematic diagram of a second DC leakage location signaling mode that may identify a default DC leakage location at a center of a determined user equipment bandwidth on which the DC leakage location is located for the user equipment of FIG. 1, according to embodiments of the present disclosure.
Figure 7:
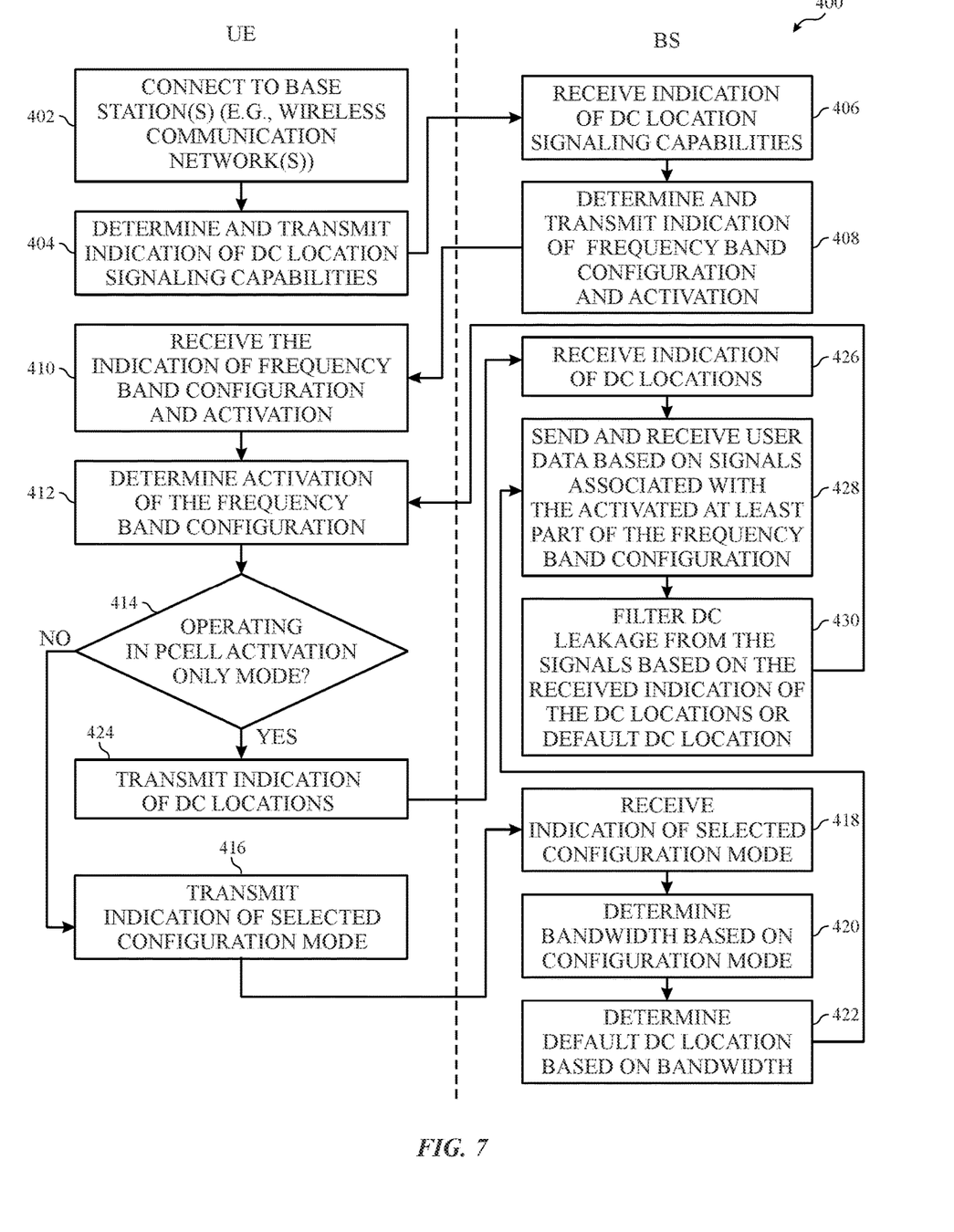
FIG. 7 is a flow chart of a method for dynamic direct current leakage location signaling based on an indication of flexible direct current leakage location signaling capabilities of the user equipment of FIG. 1 to the wireless communication network, according to embodiments of the present disclosure.

In addition to dynamically adjusting usage of available component carriers (e.g., component carriers configured by the base station 104/wireless communication network 102) for transmitting and/or receiving wireless signals based on the location of the UE 10 using 5G wireless communication networks and/or NR wireless communication networks, in some embodiments, the UE 10 may additionally or alternatively adjust a frequency bandwidth used to transmit and/or receive wireless signals within each available (e.g., configured) component carrier. In particular, the UE 10 may reconfigure an RF bandwidth associated with the UL allocated resources (e.g., UL allocated component carriers, allocated frequency bandwidths) received from the base station 104 (e.g., the wireless communication network 102) to, in some embodiments, reduce the RF bandwidth used to transmit wireless signals, thus reducing power consumption and improving emission associated with the communication system 100. In other words, the UE 10 may divide (e.g., split) a configured component carrier into one or more bandwidth parts (BWPs), each corresponding to a respective portion of the configured component carrier. For example, as shown in FIGS. 5-7, each configured CC 200 (e.g., PCC and each SCC) may be sub-divided into a first BWP 202 (e.g., BWP11), a second BWP 204 (e.g., BWP12), a third BWP 206 (e.g., BWP13), and a fourth BWP 208 (e.g., BWP14), where the first BWP 202 is equal to the entire frequency bandwidth of the respective configured CC 200. It should be understood that although FIGS. 5-7 illustrate the second, third, and fourth BWPs 204, 206, 208 as each being an equal portion of the frequency bandwidth of the respective configured CC 200, in some embodiments, the second, third, and fourth BWPs 204, 206, 208 may each be of greater or lesser frequency bandwidth amounts with respect to one another that sum to the frequency bandwidth of the first BWP 202 (e.g., the respective CC 200).

Furthermore, as discussed herein, the UE 10 may dynamically activate a desired BWP (e.g., the first, second, third, or fourth BWP 202, 204, 206, 208) of each of the configured CCs 200 to use for transmitting and/or receiving wireless signals to and/or from the base station 104 (e.g., the wireless communication network). However, determining and indicating to the wireless communication network 102 a location of DC leakage (e.g., UL carrier leakage) may be desired to enable the wireless communication network 102 to filter out the DC leakage (e.g., through tone removal signal processing), and thus reduce the DC leakage impact on the signal quality of the UL allocated resources (e.g., for the UE and/or for the other UEs on the same wireless communication network), thus improving communication quality.

With the foregoing in mind, FIG. 5 is a schematic diagram of a first direct current (DC) leakage location signaling mode 300 that may identify one or more DC leakage locations corresponding to one or more BWPs for the UE of FIG. 1, according to embodiments of the present disclosure. In some embodiments, the first DC leakage location signaling mode 300 may correspond to a DC leakage signaling method as described in Release 15. In particular, as further discussed herein, the first direct current (DC) leakage location signaling mode 300 alone may have a limited DC leakage location signaling capacity. For example, in some embodiments, the first direct current (DC) leakage location signaling mode 300 enables the UE 10 to indicate to the wireless communication network 102 the DC leakage locations associated with a single UL configured carrier (e.g., the first CC 210, PCC associated with the PSC 106). In particular, the first DC leakage location signaling mode 300 takes into account variability of the DC leakage locations based on activation of a particular BWP (e.g., the first, second, third, or fourth BWP 202, 204, 206, 208). In this way, the first DC leakage location signaling mode 300 enables the UE 10 to send up to four indications of the DC leakage locations, each DC leakage location associated with a respective BWP. For example, as illustrated in FIG. 5, using the first DC leakage location signaling mode 300, the UE 10 may indicate to the wireless communication network 102 a first DC leakage location 212 associated with the first BWP 202 of the first CC 210, a second DC leakage location 214 associated with the second BWP 204 of the first CC 210, a third DC leakage location 216 associated with the third BWP 206 of the first CC 210, and a fourth DC leakage location 218 associated with the fourth BWP 208 of the first CC 210. However, in some embodiments, the first DC leakage location signaling mode 300 comprises a limited DC leakage location signaling capacity in that it only enables up to four DC leakage locations to be indicated by the UE 10. As discussed herein, in some embodiments, the UE 10 may utilize additional configured CC 200 (e.g., other than a single CC such as a second, third and fourth CC 220, 222, 224) and/or respective BWP of the additional configured CC 200 of the UL allocated resources to transmit and/or receive wireless signals, which then may affect the location of the DC leakage such that an actual location of the DC leakage may fall outside of the allowed four DC leakage locations of the first DC leakage location signaling mode 300. As discussed herein, accurate determination and indication of the DC leakage location by the UE 10 to the wireless communication network is desired so as to enable the wireless communication network to filter out the undesired DC leakage, such as by single tone signal processing, thus reducing signal distortion and in-band emission that may be cause by the DC leakage.

Furthermore, FIG. 5 illustrates the limited conventional DC leakage location signaling capabilities of another embodiment of the first DC leakage location signaling mode 302. For example, in some embodiments, the first DC leakage location signaling mode 300 may correspond to a DC leakage signaling method as described in Release 16. In particular, the first DC leakage location signaling mode 300 may enable the UE 10 to indicate to the wireless communication network 102 the DC leakage locations associated with two UL configured carrier (e.g., the first CC 210/PSC 106/PCC and a second CC 220/SSC/SCC 108). In particular, the first DC leakage location signaling mode 300 may take into account variability of the DC leakage locations based on activation of a particular BWP, such as respective first, second, third, or fourth BWP 202, 204, 206, 208 of each of the first and second CC 210, 220, in addition to DC leakage locations associated with activation of only a single CC 210 (e.g., PCC associated with the PSC 106). In this way, the first DC leakage location signaling mode 300 enables the UE 10 to send up to twenty indications of the DC leakage locations, each DC leakage location associated with a respective BWP and/or combination of BWPs associated with the first and second CC 210, 220. For example, as illustrated in FIG. 5, using the first DC leakage location signaling mode 300, the UE 10 may indicate in a scenario A to the wireless communication network 102 the first DC leakage location 212 associated with activation of only the first BWP 202 of the first CC 210, and/or a fifth DC leakage location 226 associated with activation of the second BWP 204 of the first CC 210 in combination with a second BWP 204 of the second CC 220. However, the first DC leakage location signaling mode 300 includes a limited DC leakage location signaling capacity in that it only enables up to twenty DC leakage locations to be indicated by the UE 10. As discussed herein, in some embodiments, the UE 10 may utilize additional configured CC 200 (e.g., other than the two CC, such as a third and fourth CC 222, 224) and/or a respective BWP of the additional configured CC 200 of the UL allocated resources to transmit and/or receive wireless signals, which then may affect (e.g., adjust, alter, change) the location of the DC leakage, such that an actual location of the DC leakage may fall outside of the allowed twenty DC leakage locations of the first DC leakage location signaling mode 300. As discussed herein, accurate determination and indication of the DC leakage location by the UE 10 to the wireless communication network is desired so as to enable the wireless communication network 102 to filter out the undesired DC leakage, such as by single tone signal processing, thus reducing signal distortion and in-band emission that may be cause by the DC leakage. Furthermore, expanding on the first DC leakage location signaling mode 300 to include additional potential DC leakage locations associated with the third and/or fourth CC 222, 224, or so on, would lead to an exponential increase in the number of indicated DC leakage locations, as the number of BWP combination permutations (e.g., indicated DC leakage locations) is equal to $4^N+4$, where N is the number configured UL CCs 200. As a result, signal complexity would increase exponentially with an increase in the number of configured UL CCs 200.

Furthermore, FIG. 6 is a schematic diagram of a second DC leakage location signaling mode that may identify a default DC leakage location at a center of a determined UE bandwidth on which the DC leakage location is located for the UE of FIG. 1, according to embodiments of the present disclosure. In some embodiments, the second DC leakage location signaling mode 304 may correspond to a DC leakage signaling method as described in Release 17. In particular, as further discussed herein, the second DC leakage location signaling mode 304 has limited flexibility for determining DC leakage locations and may lead to inaccurate DC leakage location signaling. For example, in some embodiments, the second DC leakage location signaling mode 304 may enable the wireless communication network 102 to determine a default DC leakage location (e.g., first default DC leakage location 306, second default DC leakage location 308) and in some embodiments, receive a frequency offset value relative to the default DC leakage location indicated by the UE 10. In some embodiments, the frequency offset value may be used to adjust the default leakage location to produce an adjusted default DC leakage location. However, the frequency offset value may be a single fixed frequency offset value indicated by the UE 10 to the wireless communication network 102, and may be used by the wireless communication network 102 to adjust the default DC leakage location for each configuration operation selected by the UE 10. Furthermore, the default DC leakage location may be defined as a mathematical center of a determined UE bandwidth 310 rounded to a subcarrier grid defined for the CC 200 (e.g., first CC 210, second CC 220, etc.) on which the DC leakage location is located. The UE bandwidth 310 may be determined based on a configuration operation (e.g., a configuration mode) selected by the UE 10. For example, in some embodiments, the UE 10 may receive from the wireless communication network 102 an indication of one or more CCs 200 available to the UE 10 for configuration and communication with the wireless communication network 102. The UE 10 may then configure one or more of the available CCs 200 and select the configuration operation. The UE 10 may transmit an indication of the selected configuration operation to the wireless communication network 102 that then enables determination (e.g., calculation) of the UE bandwidth 310. The default DC leakage location may then be determined based on the UE bandwidth 310. For example, in some embodiments, the one or more configuration operations may include configured CCs (e.g., illustrated in scenario A of FIG. 6), activated CCs (e.g., illustrated in scenario B of FIG. 6), configured BWPs, and activated BWPs.

Using FIG. 6 as an example, scenario A includes a UE 10 CC configuration of the first CC 210, the second CC 220, the third CC 222, and the fourth CC 224 with each of the first, the second, the third, and the fourth CCs 210, 220, 222, 224 activated (e.g., indicated by shading). As such, in scenario A, a first UE bandwidth 312 corresponding to the selected configuration operation of the configured CCs may extend from a lowest frequency value 314 of the first CC 210 to a highest frequency value 316 of the fourth CC 224. In this case, the first default DC leakage location 306 may be determined to be located at a frequency value corresponding to a highest frequency value 320 of the second CC 220 and/or a lowest frequency value 322 of the third CC 222. As another example, scenario B includes a UE 10 CC configuration of the first CC 210, the second CC 220, the third CC 222, and the fourth CC 224 with the second BWP 204 of the first CC 210, the second BWP 204 of the second CC 220, and the third BWP 206 of the third CC 222 each activated. As such, in scenario B, a second UE bandwidth 324 corresponding to the selected configuration operation of the activated CCs may extend from the lowest frequency value 314 of the first CC 210 to a highest frequency value 326 of the third CC 222. In this case, the second default DC leakage location 308 may be determined to be located at a frequency value corresponding to a center (e.g., middle) of the second CC 220 (e.g., the third BWP 206 of the second CC 220). Furthermore, in scenario B, a third UE bandwidth 328 corresponding to the selected configuration operation of the configured BWPs may extend from the lowest frequency value 314 of the first CC 210 to a highest frequency value 330 of the second BWP 204 of the fourth CC 224. In this case, a third default DC leakage location 332 may be determined to be located at a frequency value corresponding to a highest frequency value 334 of the third BWP 206 of the second CC 220 and/or the lowest frequency value 336 of the fourth BWP 208 of the second CC 220 (e.g., between the third BWP 206 of the second CC 220 and the fourth BWP 208 of the second CC 220). Moreover, in scenario B, a fourth UE bandwidth 338 corresponding to the selected configuration operation of the activated BWPs may extend from the lowest frequency value 314 of the first CC 210 to a highest frequency value 340 of the third BWP 206 of the third CC 222. In this case, a fourth default DC leakage location 342 may be determined to be located at a frequency value corresponding to a highest frequency value 344 of the second BWP 204 of the second CC 220 and/or the lowest frequency value 346 of the third BWP 206 of the second CC 220 (e.g., between the second BWP 204 of the second CC 220 and the third BWP 206 of the second CC 220).

As discussed herein, the second DC leakage location signaling mode 304 alone has limited flexibility because only a single fixed frequency offset value may be indicated (e.g., communicated) by the UE 10 to the wireless communication network 102 which would then be applied to a determined default DC leakage location of any configuration operation selected by the UE 10. However, in actual UE 10 implementation of the second DC leakage location signaling mode 304, the frequency offset value may not be applicable to the various determined UE bandwidth 310 corresponding to each of the different configuration operations (e.g., configured carriers, activated carriers, configured BWPs, activated BWPs). Therefore, the frequency offset value relative to the default DC location may not be useful and/or produce accurate DC leakage location results in each configuration operation selected by the UE 10, such as when only the PCC is activated. Thus, when utilizing the second DC leakage location signaling mode 304, the UE 10 may cause the wireless communication network 102 to determine (e.g., calculate) one or more inaccurate DC leakage locations, which may not be useful in significantly reducing the impact of the DC leakage on the signal quality of the UL allocated resources. In particular, the one or more inaccurate DC leakage location may prevent the wireless communication network 102 from efficiently using the tone removal processes (e.g., signal processing) to filter out the DC leakage, and thus may enable the DC leakage to negatively affect the signal quality of the UL allocated resources (e.g., for the UE 10 and/or for the other UEs on the same wireless communication network 102).

Therefore, this disclosure is directed to an improved DC leakage location signaling capability for the UE 10 that enables a flexible reporting mechanism for DC leakage location signaling that facilitates transmission by the UE 10 of indications of more accurate DC leakage locations to the wireless communication network 102 for improved reduction of the negative impact of the DC leakage on signal quality of the UL allocated resources (e.g., to the UE 10 and/or to other UEs within the same wireless communication network 102). In particular, the UE 10 may operate in the first DC leakage location signaling mode 300 or the second DC leakage location signaling mode 304 based on an activation state (e.g., activated, deactivated) of at least a portion of one or more CCs 200 (e.g., configured component carriers, frequency band configuration, frequency bandwidths). The UE 10 may operate in the first DC leakage location signaling mode 300 when only a single component carrier 200 (e.g., the first CC 210, configured CC, frequency bandwidth, PCC) is activated, and thus identify and transmit to the wireless communication network 102 one or more DC leakage locations corresponding to the single CC 200. Alternatively, the UE 10 may operate in the second DC leakage location signaling mode 304 when at least a portion of two or more CCs 200 are activated, and thus enable the wireless communication network 102 to compute (e.g., determine, calculate) the default DC leakage location associated with the determined UE bandwidth. In some embodiments, the determined UE bandwidth may correspond to a frequency range that includes the at least a portion of two or more CC 200. In this way, the present embodiments enable a flexible operation for DC leakage location signaling for the UE 10, and thus enable efficient and effective reduction in signal distortion and/or in-band emission within the UL allocated resources that may be caused by the DC leakage. Furthermore, the improved DC leakage location signaling capability for the UE 10 may enable the UE 10 to leverage the power saving benefits of flexibly activating one or more BWPs (e.g., reduce the UE bandwidth), as opposed to activating an entire CC, without impacting the accuracy of determining and indicating the DC leakage locations to the wireless communication network 102. Furthermore, when the UE 10 operates in the first DC leakage location signaling mode 300, the improved DC leakage location signaling capability enables the UE 10 to indicate exact DC leakage locations when operating (e.g., communicating, transmitting signals) using only the PCC (e.g., only the PCC UL is activated), thus increasing communication quality by enabling the wireless communication network 102 to more accurately filter DC leakage that may impact signal quality, as discussed herein. Additionally, when the UE 10 operates in the second DC leakage location signaling mode 304, the improved DC leakage location signaling capability enables the wireless communication network 102 to compute the default DC leakage location which reduces amount of data by reducing a number of DC leakage locations indicated to the wireless communication network 102, thus reducing signal complexity and overall network congestion which improves an overall network performance.

With the foregoing in mind, FIG. 7 is a method 400 for dynamic DC leakage location signaling based on an indication of flexible DC leakage location signaling capabilities (e.g., UL carrier leakage signaling capability, indicated by information element (IE) DCPCellBWP included in RRC transmission) of the UE 10 to the wireless communication network 102, according to embodiments of the present disclosure. Any suitable device (e.g., a controller) that may control components of the UE 10, the wireless communication network 102, and/or the base station 104, such as the processor 12, may perform the method 400. In some embodiments, the method 400 may be implemented by executing instructions stored in a tangible, non-transitory, computer-readable medium, such as the memory 14 or storage 16, using the processor 12. For example, the method 400 may be performed at least in part by one or more software components, such as an operating system of the UE 10, the wireless communication network 102, and/or the base stations 104, one or more software applications of the UE 10, the wireless communication network 102, and/or the base stations 104, and the like. While the method 400 is described with respect to a single UE 10 communicating with a single base station 104 (e.g., single wireless communication network 102), it should be appreciated that any suitable number of UEs 10 and/or base stations 104 (e.g., wireless communication networks 102) may implement the methods described herein. Furthermore, while the method 400 is described using steps in a specific sequence, it should be understood that the present disclosure contemplates that the described steps may be performed in different sequences than the sequence illustrated, and certain described steps may be skipped or not performed altogether.

In process block 402, the UE 10 may activate and connect to (e.g., communicatively couple to, establish communication with) a base station 104 associated with a wireless communication network 102. As discussed herein, the base station 104 may advertise, broadcast, or otherwise transmit radio frequency (RF) signals and the UE 10 may detect the base station 104 by receiving the RF signals when the UE 10 enters a coverage area of the base station 104 (e.g., the PSC 106, the one or more SSCs such as the first SSC 108 and/or the second SSC 110). The base station 104 may form a connection (e.g., communication link) with the UE 10 and, in process block 404, the UE 10 may determine and/or transmit an indication of flexible DC leakage location signaling capabilities (e.g., information element (IE) DCPCellBWP included in the RRC protocol transmission) to the base station 104 (e.g., the wireless communication network 102). In particular, the indication of flexible DC leakage location signaling capabilities may indicate that the UE 10 may operate in the first DC leakage location signaling mode 300 or the second DC leakage location signaling mode 304 based on an activation state (e.g., activated, deactivated) of at least a portion of one or more CCs 200 (e.g., configured component carriers, frequency band configuration, frequency bandwidths). As discussed herein, the UE 10 may operate in the first DC leakage location signaling mode 300 when only a single component carrier 200 (e.g., the first CC 210, configured CC, frequency bandwidth, PCC) is activated, and thus identify and transmit to the wireless communication network 102 one or more DC leakage locations corresponding to the single CC 200. Alternatively, the UE 10 may operate in the second DC leakage location signaling mode 304 when at least a portion of two or more CCs 200 are activated, and enable the wireless communication network 102 to compute (e.g., determine, calculate) the default DC leakage location associated with the determined UE bandwidth. In some embodiments, as discussed herein, the determined UE bandwidth may correspond to a frequency range that includes the at least a portion of two or more CC 200. Returning to process block 404, the UE 10 may synchronize to the base station 104 and the base station 104 may broadcast or transmit system information indicative of frequency bands (e.g., one or more CCs 200) supported by the base stations. The system information may also include timing specification, power specification, GPS or GNSS coordinates, and/or any other suitable information to enable the UE 10 to establish communication with the base station 104 (e.g., the wireless communication network 102).

In process block 406, the base station 104 (e.g., wireless communication network 102) may receive the indication of flexible DC leakage location signaling capabilities (e.g., information element (IE) DCPCellBWP included in the RRC protocol transmission) transmitted by the UE 10 and may additionally, in process block 408, determine and transmit an indication of one or more CCs 200 (e.g., a frequency band configuration) available for the UE 10 to configure and activate for wireless communication with the wireless communication network 102. The UE 10, in process block 410, may receive the indication of available one or more CCs 200 for configuration (e.g., the frequency band configuration) and activation of the available one or more CCs 200, and then configure the one or more CCs 200 based on the received indication. Furthermore, in some embodiments, in process block 412, the UE 10 may determine the activation of the one or more configured CCs 200. In some embodiments, the UE 10 may determine the activation of at least part of the frequency band configuration, such as one or more of the BWPs (e.g., the first, second, third, or fourth BWP 202, 204, 206, 208) of the one or more CCs 200.

In process block 414, the UE 10 may determine if the UE 10 is operating (e.g., communicating via wireless signals) in an activated PCC only mode (e.g., activated primary cell only mode, activated first CC 210 only). For example, as discussed herein, the UE 10 may operate in a PCC only mode due to being inside of the geographic coverage area associated with the PSC 106 but outside of the geographic coverage area associated with one or more SSCs (e.g., the first and second SSC 108, 110). Additionally or alternatively, in some embodiments, the UE 10 may operate in a PCC only mode to reduce an overall UE bandwidth, thus reducing power consumption. If the UE 10 determines that the UE 10 is not operating in the activated PCC only mode, then, in process block 416, the UE 10 may transmit an indication of a selected configuration mode (e.g., a configuration operation) to the base station 104. As discussed herein, the UE bandwidth 310 may be determined based on the UE 10 selected configuration mode. Furthermore, in process block 418, the base station 104 may receive the indication of the selected configuration mode and, in process block 420, determine UE bandwidth 310 based on the indication of the UE selected configuration mode. In process block 422, the base station 104 may then determine the default DC leakage location based on the determined UE bandwidth 310 and, in process block 428, the base station 104 may transmit and receive wireless signals (e.g., user data) associated with the UE 10 using the activated at least part of the frequency configuration band (e.g., the one or more activated CCs and/or one or more activated BWPs).

Returning to the process block 414, if, on the other hand, the UE 10 determines that the UE 10 is operating in the activated PCC only mode, then, in process block 424, the UE 10 may determine and transmit an indication of up to four actual DC leakage locations associated with the PCC (e.g., the first CC 210, the BWPs of the PCC/the first CC 210) to the base station 104 (e.g., the UE 10 operate in the first DC leakage location signaling mode). Furthermore, in process block 426, the base station 104 may receive the indication of the actual DC leakage locations of the PCC, and as discussed above, in process block 428, transmit and receive wireless signals (e.g., user data) associated with the UE 10 using the activated at least part of the frequency configuration band (e.g., the one or more activated CCs and/or one or more activated BWPs). In addition, in process block 430, the base station 104 may filter out the DC leakage from the wireless signals based on the default DC leakage location when the UE 10 is operating in the second DC leakage location signaling mode 304 or the received indication of the actual DC leakage locations associated with the PCC when the UE 10 is operating in the first DC leakage location signaling mode 300. It should be appreciated that in some embodiments, as discussed herein, the UE 10 may additionally send in conjunction with the indication of the UE selected configuration mode, the frequency offset value associated with the default DC leakage location. In this case, the base station 104 may adjust the default DC leakage location based on the frequency offset value and, in the process block 430, filter out the DC leakage from the wireless signals based on the adjusted default DC leakage location (e.g., based on the default DC leakage location and the frequency offset value).

To enable flexible DC leakage location signaling of the UE 10, the method 400 may continuously return to the process block 412 to determine if the UE 10 is operating in the PCC only mode. In this way, the UE 10 may operate alternatively in the two modes of DC leakage location signaling based on whether or not the UE 10 is operating in the PCC only mode. As discussed herein, the improved DC leakage location signaling capability for the UE 10 is a flexible reporting mechanism for DC leakage location signaling that facilitates transmission by the UE 10 of indications of more accurate DC leakage locations to the wireless communication network 102 for improved filtering and signal processing by the wireless communication network 102 to reduce of the negative impact of the DC leakage on signal quality of the UL allocated resources (e.g., to the UE 10 and/or to other UEs within the same wireless communication network 102). In this way, the improved DC leakage location signaling capability for the UE 10 enables reduction in signal distortion and/or in-band emission within the UL allocated resources that may be caused by the DC leakage. In addition, the improved DC leakage location signaling capability for the UE 10 enables the UE 10 to leverage the power saving benefits of flexibly activating one or more BWPs (e.g., reduce the UE bandwidth, operate in PCC only mode), as opposed to activating two or more CCs and/or an entire CC bandwidth, without impacting the accuracy of determining and indicating the DC leakage locations to the wireless communication network 102. In particular, when the UE 10 operates in the first DC leakage location signaling mode 300, the improved DC leakage location signaling capability enables the UE 10 to indicate more precise (e.g., exact) DC leakage locations when operating (e.g., communicating, transmitting signals) using only the PCC (e.g., only the PCC UL is activated), thus increasing communication quality by enabling the wireless communication network 102 to more accurately filter DC leakage that may impact signal quality, as discussed herein. Additionally, when the UE 10 operates in the second DC leakage location signaling mode 304, the improved DC leakage location signaling capability enables the wireless communication network 102 (e.g., the base station 104) to compute the default DC leakage locations based on an indication of the UE selected configuration mode which reduces amount of data by reducing a number of DC leakage locations indicated to the wireless communication network 102, thus reducing signal complexity and overall network congestion which improves an overall network performance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a transmitter; and
one or more processors coupled to the transmitter, the one or more processors configured to
cause the transmitter to transmit a first indication of an uplink carrier leakage signaling capability to a wireless communication network communicatively coupled to the user equipment,
operate in a first uplink carrier leakage signaling mode when only at least a portion of a first configured component carrier of one or more configured component carriers is activated, the wireless communication network configured to filter uplink carrier leakage based on one or more uplink carrier leakage locations associated with the first configured component carrier; and
operate in a second uplink carrier leakage signaling mode when the at least a portion of the first configured component carrier and at least a portion of a second configured component carrier of the one or more configured component carriers are activated, the wireless communication network configured to filter the uplink carrier leakage based at least in part on a default uplink carrier leakage location of a user equipment bandwidth associated with the first configured component carrier and the second configured component carrier.

2. The user equipment of claim 1, wherein the uplink carrier leakage signaling capability indicates that the user equipment is configured to operate in the first uplink carrier leakage signaling mode or the second uplink carrier leakage signaling mode based on activation of only the at least a portion of the first configured component carrier.

3. The user equipment of claim 1, wherein the first uplink carrier leakage signaling mode comprises causing the transmitter to transmit a second indication of the one or more uplink carrier leakage locations associated with the first configured component carrier.

4. The user equipment of claim 3, wherein the first uplink carrier leakage signaling mode comprises causing the transmitter to transmit the second indication to the wireless communication network.

5. The user equipment of claim 1, wherein the second uplink carrier leakage signaling mode comprises causing the transmitter to transmit a second indication of a component carrier configuration mode of the user equipment, the component carrier configuration mode indicating that the at least a portion of the first configured component carrier and the at least a portion of the second configured component carrier are activated.

6. The user equipment of claim 5, wherein the second uplink carrier leakage signaling mode comprises causing the transmitter to transmit the second indication to the wireless communication network, the wireless communication network configured to:
receive the second indication of the component carrier configuration mode of the user equipment;
receive the user equipment bandwidth based on the component carrier configuration mode; and
determine the default uplink carrier leakage location based on the user equipment bandwidth.

7. The user equipment of claim 6, wherein the second indication comprises a frequency offset value, the wireless communication network configured to filter the uplink carrier leakage based on the default uplink carrier leakage location and the frequency offset value.

8. The user equipment of claim 6, wherein the default uplink carrier leakage location corresponds to a center frequency value of a frequency range of the user equipment bandwidth.

9. The user equipment of claim 1, wherein the one or more processors are configured to determine activation of each configured component carrier of the one or more configured component carriers, one or more portions of at least one configured component carrier of the one or more configured component carriers, or both.

10. A tangible, non-transitory computer-readable medium, comprising computer-readable instructions that, when executed by processing circuitry of user equipment, are configured to cause the processing circuitry to:
causing a transmitter of the user equipment to transmit a first indication of an uplink carrier leakage signaling capability to a wireless communication network communicatively coupled to the user equipment,
operate in a first uplink carrier leakage signaling mode when only at least a portion of a first configured component carrier of one or more configured component carriers is activated, the wireless communication network configured to filter uplink carrier leakage based on one or more uplink carrier leakage locations associated with the first configured component carrier; and
operate in a second uplink carrier leakage signaling mode when the at least a portion of the first configured component carrier and at least a portion of a second configured component carrier of the one or more configured component carriers are activated, the wireless communication network configured to filter the uplink carrier leakage based at least in part on a default uplink carrier leakage location of a user equipment bandwidth associated with the first configured component carrier and the second configured component carrier.

11. The tangible, non-transitory computer-readable medium of claim 10, wherein the uplink carrier leakage signaling capability indicates that the user equipment is configured to operate in the first uplink carrier leakage signaling mode or the second uplink carrier leakage signaling mode based on activation of only the at least a portion of the first configured component carrier.

12. The tangible, non-transitory computer-readable medium of claim 10, wherein the instructions are configured to cause the processing circuitry to cause the transmitter to transmit and based on operating in the first uplink carrier leakage signaling mode, a second indication of the one or more uplink carrier leakage locations associated with the first configured component carrier to the wireless communication network.

13. The tangible, non-transitory computer-readable medium of claim 10, wherein the instructions are configured to cause the processing circuitry to cause the transmitter to transmit, based on operating in the second uplink carrier leakage signaling mode, a second indication of a component carrier configuration mode of the user equipment, the component carrier configuration mode indicating that the at least a portion of the first configured component carrier and the at least a portion of the second configured component carrier are activated.

14. The tangible, non-transitory computer-readable medium of claim 13, wherein the instructions are configured to cause the processing circuitry to cause the transmitter to transmit, based on operating in the second uplink carrier leakage signaling mode, the second indication to the wireless communication network, the wireless communication network configured to:
receive the second indication of the component carrier configuration mode of the user equipment;
receive the user equipment bandwidth based on the component carrier configuration mode; and
determine the default uplink carrier leakage location based on the user equipment bandwidth.

15. The tangible, non-transitory computer-readable medium of claim 14, wherein the second indication comprises a frequency offset value, the wireless communication network configured to filter the uplink carrier leakage based on the default uplink carrier leakage location and the frequency offset value.

16. The tangible, non-transitory computer-readable medium of claim 14, wherein the default uplink carrier leakage location corresponds to a center frequency value of a frequency range of the user equipment bandwidth.

17. A method comprising:
causing a transmitter of user equipment to transmit a first indication of an uplink carrier leakage signaling capability to a wireless communication network communicatively coupled to the user equipment,
operating, via processing circuitry of the user equipment, in a first uplink carrier leakage signaling mode when only at least a portion of a first configured component carrier of one or more configured component carriers is activated, the wireless communication network configured to filter uplink carrier leakage based on one or more uplink carrier leakage locations associated with the first configured component carrier; and
operating, via the processing circuitry, in a second uplink carrier leakage signaling mode when the at least a portion of the first configured component carrier and at least a portion of a second configured component carrier of the one or more configured component carriers are activated, the wireless communication network configured to filter the uplink carrier leakage based at least in part on a default uplink carrier leakage location of a user equipment bandwidth associated with the first configured component carrier and the second configured component carrier.

18. The method of claim 17, wherein the first uplink carrier leakage signaling mode comprises causing the transmitter to transmit a second indication of the one or more uplink carrier leakage locations associated with the first configured component carrier to the wireless communication network.

19. The method of claim 17, wherein the second uplink carrier leakage signaling mode comprises causing the transmitter to transmit a second indication of a component carrier configuration mode of the user equipment to the wireless communication network, the wireless communication network configured to:
   receive the second indication, wherein the second indication comprises a frequency offset value;
   receive the user equipment bandwidth based on the component carrier configuration mode;
   determine the default uplink carrier leakage location based on the user equipment bandwidth; and
   filter the uplink carrier leakage based on the default uplink carrier leakage location and the frequency offset value.

20. The method of claim 17, comprising determining, via the processing circuitry, activation of each configured component carrier of the one or more configured component carriers, one or more portions of at least one configured component carrier of the one or more configured component carriers, or both.

\* \* \* \* \*